(12) United States Patent
Rocquelay et al.

(10) Patent No.: US 9,052,951 B2
(45) Date of Patent: Jun. 9, 2015

(54) SOFTWARE BUS

(71) Applicant: SAGEMCOM BROADBAND SAS, Rueil-Malmaison (FR)

(72) Inventors: Antonie Rocquelay, Rueil-Malmaison (FR); Laurent Alarcon, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 14/365,913

(22) PCT Filed: Dec. 14, 2012

(86) PCT No.: PCT/EP2012/075652
§ 371 (c)(1),
(2) Date: Jun. 16, 2014

(87) PCT Pub. No.: WO2013/087894
PCT Pub. Date: Jun. 20, 2013

(65) Prior Publication Data
US 2014/0373017 A1    Dec. 18, 2014

(30) Foreign Application Priority Data

Dec. 16, 2011    (FR) ..................... 11 61746

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 9/48* | (2006.01) | |
| *G06F 9/54* | (2006.01) | |

(52) U.S. Cl.
CPC .............. *G06F 9/4881* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 2001/0029548 A1* | 10/2001 | Srikantan et al. ............. | 709/250 |
| 2008/0140998 A1* | 6/2008 | Kissell ......................... | 712/214 |
| 2010/0146168 A1 | 6/2010 | Shin et al. | |
| 2010/0269027 A1 | 10/2010 | Arimilli et al. | |
| 2012/0159495 A1* | 6/2012 | Rajagopalan et al. ........ | 718/102 |

FOREIGN PATENT DOCUMENTS

WO    WO 03/007105 A2    1/2003

OTHER PUBLICATIONS

Translation of Jun. 17, 2014 International Preliminary Report on Patentability.

(Continued)

*Primary Examiner* — Craig Dorais
(74) *Attorney, Agent, or Firm* — Oliff PLC; R. Brian Drozd (57) ABSTRACT

The present invention relates to the field of methods of communication between software modules and more particularly software buses. There is described a software bus which allows communication between software modules. This communication occurs within a machine and between machines and operates interchangeably for the software module whether one is dealing with a process, a thread or a simple task. The communication relies on mechanisms adapted to the multitask level at which the sender and receiver software modules operate. It is based on a hierarchical architecture, phases of discovery and of recording of the various software modules having to communicate via the bus.

8 Claims, 7 Drawing Sheets

(56) References Cited

OTHER PUBLICATIONS

Purtilo; "The Polylith Software Bus;" ACM Transactions on Programming Languages and Systems; vol. 16; No. 1; Jan. 1994; pp. 151-174; XP055033844.

Callahan et al; "A Software Bus for Thread Objects;" Departments of Statistics and Computer Science Concurrent Engineering Research Center, West Virginia University; 1994; pp. 1-17; XP055033846.

Zhang et al.; "A Supporting Platform for New Generation of EMS Based on PC Cluster;" Power and Energy Society General Meeting—Conversion and Delivery of Electrical Energy in the $21^{st}$ Century; 2008 IEEE; Jul. 20, 2008; pp. 1-8; XP031304255.

May 7, 2013 International Search Report issued in International Patent Application No. PCT/EP2012/075652; with English-language translation.

* cited by examiner

SOFTWARE BUS

BACKGROUND OF THE INVENTION

The present invention is concerned with the field of methods for communication between software modules and more particularly software buses.

Information processing devices work under the control of an operating system. These operating systems are multitask and enable the scheduling of a plurality of software modules. These software modules may be of several types according to the scheduler that organises the multitasking and the possibilities of a hierarchy of modules.

Historically, operating systems enable the scheduling of processes. A process is defined as a software module having its own control and its own memory space. The scheduling of processes is typically performed today in a pre-emptive manner. That is to say the scheduler decides in an arbitrary fashion on the times to switch context between the processes. The context of the current process, typically the content of memory caches, the content of the processor registers and the pointer instructing the control, is then saved. Another process that is waiting is selected and the context thereof is restored. It can then continue its execution.

Context switching is a relatively complex process. The need to drive lighter parallel software modules has arisen. The concept of threads has therefore been created. Typically, a set of threads is scheduled in a common memory space, it is generally a case of one process.

In some cases, it is possible to implement a supplementary level and to schedule a set of tasks actually within a thread. The scheduling may then be pre-emptive or not. The other scheduling family, cooperate scheduling, takes place at the time of specific system calls where the task passes control explicitly to the scheduler. The main difference relates to the fact that, in such scheduling, a task entering an infinite loop may prevent the system from taking over and block the complete system. The advantage being that, since a task cannot be interrupted at any time, it is not necessary to protect the resources shared by mutual exclusion (mutex) mechanisms.

We shall therefore consider the software executed on an information processing device as one or more processes, each process being able itself to consist of one or more threads, each thread being able to consist of one or more tasks. The scheduling of the processes and threads will be considered to be pre-emptive, while the scheduling of the tasks may be pre-emptive or not. We generically use the term software module to designate all these processes, threads and tasks.

Figure 1:
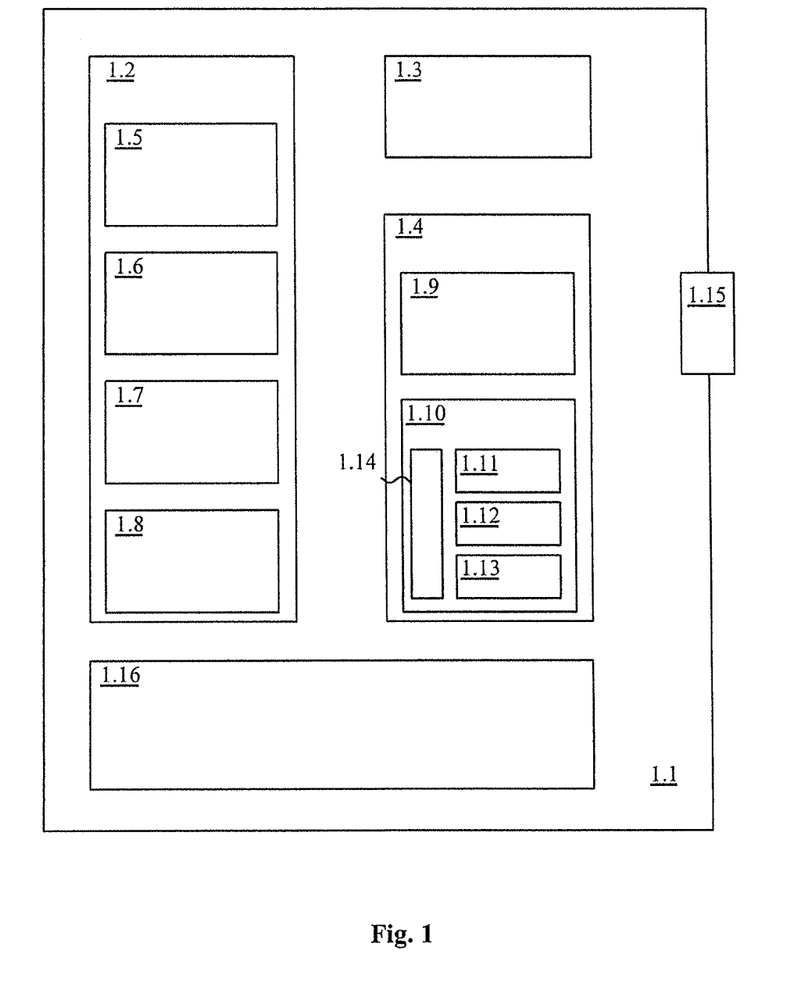
FIG. 1 illustrates the various types of software module that can be executed on a machine.

This hierarchy of software modules is illustrated by FIG. 1. An information processing device 1.1 can be seen therein. This device enables three processes 1.2, 1.3 and 1.4 to be executed in parallel. These processes are scheduled by the operating system 1.16. The process 1.2 contains several threads 1.5, 1.6, 1.7 and 1.8 executed in parallel, scheduled by the operating system 1.16. The process 1.3 does not contain any threads. The process 1.4 contains a first thread 1.9 and a second thread 1.10. This second thread 1.10 itself contains several tasks 1.11, 1.12 and 1.13 executed in parallel under the control of a scheduler 1.14, itself executed within the thread 1.10. The device has at least one communication port 1.15 affording communication with other devices via a communication network, typically an IP network.

When it is sought to make software modules communicate, solutions dedicated to a given level of parallelism are found in the prior art. The main technologies are dedicated to communication between processes. Message queues, UNIX sockets for communication between processes of the same device and INET sockets for communication between processes situated on remote devices connected to an IP (Internet Protocol) network can be cited. Software buses exist, such as the D-Bus, which is a system for communication between processes. It is not suitable for software modules neither such as simple tasks nor for threads nor for communication between machines.

The invention aims to propose a communication system or software bus that affords communication between software modules. This communication occurs in a machine and between machines and indifferently functions for the software module, whether it is a case of a process, a thread or a simple task. The communication is based on mechanisms adapted to the multitask level at which the sender and receiver software modules operate. It is based on a hierarchical architecture, phases of discovery and of recording of the various software modules having to communicate via the bus.

BRIEF SUMMARY OF THE INVENTION

The present invention therefore concerns an information processing device that comprises:
   an operating system;
   at least one process scheduled by said operating system, and
   threads that can be scheduled in said processes by said operating system. It is characterised in that it further comprises;
   in each thread, at least one user task or a system task,
   each thread itself containing an FIFO for each task that said thread contains as well as a bus management module of the thread type itself integrating a proprietary scheduler for scheduling the task or tasks of said thread,
   and in that, so that a first task can transmit a message to a second task, it comprises
   means for seeking the process on which said second task depends, and
   means, if said second task belongs to the same process as said first task, for posting said message in the FIFO dedicated to said second task so that the latter can take it into account,
   means, if the second task belongs to a process other than the process on which said first task depends,
   for creating a distant relay task in a threador of said process on which the second task depends,
   for creating a relay task in a thread of said process on which the first task depends,
   for creating a connection between the process on which the first task depends and the process on which the second task depends,
   for posting said message in the FIFO dedicated to said relay task,
   for transmitting it to the distant relay task via said connection,
   for posting it in the FIFO of the second task so that it can take it into account.

Advantageously, the means for seeking the process on which said second task depends consist of bus management modules associated with each process, each of said bus management modules comprising a routing table listing the tasks and the threads of said process on which they depend.

Advantageously, the means for transmitting a message between said relay task and said distant relay task consists, for each process, of an inter-process communication module hosted by a thread of said process.

Advantageously, said information processing device comprises means for initialising one of said processes as the master process and the other processes as slave processes.

The master process comprises an inter-device communication module hosted by a thread of said process so as to be able to transmit a message between a relay task of said device and a distant relay task hosted on another information processing device.

The invention also concerns a method for exchanging messages between tasks running on one or two information processing devices as just described. The method is characterised in that, in order to transmit a message from a first task to a second task, it comprises:

the following steps implemented by the bus management module of the thread hosting said first task:
when said second task belongs to the same processor as said first task, a step of posting said message in the FIFO dedicated to said second task so that the latter can take it into account, otherwise
a step of transmission, to said bus management module of the master process, of a message seeking the second task, the following steps implemented by the bus management module of the master process:
when said second task is hosted by a thread of said master process,
a step of creating a distant relay task in a thread of said master process,
a step of transmitting a response to said bus management module of the thread hosting the first task,
otherwise:
a step of broadcasting, to each of said bus management modules of the process type, a message seeking the second task, the following steps implemented by the bus management module of a slave process hosting the second task, on reception of a message seeking the second task,
a step of creating a distant relay task in a thread of said slave process,
a step of transmitting a response to said bus management module of the master process, the step also implemented by the bus management module of the master process, following the reception of the response transmitted by the bus management module of the slave process, of transmitting a response to said bus management module of the thread hosting the first task, and the following steps implemented by the bus management module of the thread hosting said first task, when it has received a response from said bus management module of the master process:
a step of creating a relay task corresponding to said distant relay task in a thread of said process hosting said first task, and
a step of posting said message in the FIFO dedicated to said relay task, which will transmit it to the distant relay task, and then to the second task.

According to another advantageous feature of the invention, said method comprises the following steps of initialising said bus:

a step where the modules managing the bus of the slave processes establish a connection link with the module managing the bus of the master process;
a step where each client task of the bus is recorded with the module managing the bus on which it depends;
a step of creating an FIFO associated with each client task of the bus and with each management module of the bus;
a step where the management module of the bus of a slave process that receives records of client software modules of the bus exports these records to the management module of the bus of the master process.

According to another advantageous feature of the invention, said initialisation steps further comprise a step of creating, in the master process, as many relay tasks as there are client tasks of the bus in the slave process in the device.

According to another advantageous feature of the invention, the client tasks of the bus are recorded with a public or private mode, only the public tasks are exported to the master process.

According to another advantageous feature of the invention, said method also comprises a step of discovery between machines participating in the bus. Said step of discovery between machines participating in the bus comprises for example:

an announcement step where each machine participating in the bus sends an announcement over the communication network connecting said machines;
a step of receiving an announcement message coming from a distant machine;
a step of adding the machine originating the announcement message received in a table if it is not already known;
a step of establishing a connection with this distant machine.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE INVENTION

Figure 2:
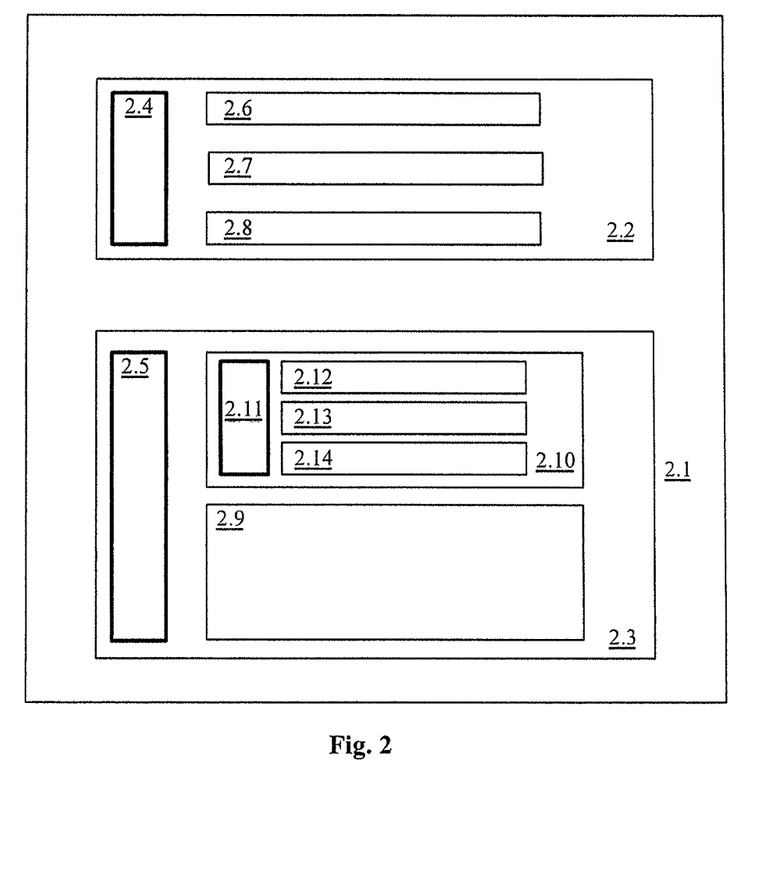
FIG. 2 illustrates the software architecture of the bus in an embodiment of the invention.

FIG. 2 illustrates the software architecture of the bus in an embodiment of the invention. The invention is based on two possible process architectures in an information processing device 2.1. The process 2.2 illustrates the first possible architecture. In this architecture, a first management software module of the bus 2.4 enables one or more software modules 2.6, 2.7 and 2.8 to communicate with the bus. These software modules intended to communicate with the bus are called client modules of the bus. These software modules are typically threads scheduled in parallel in the process. The management module of the bus 2.4 is also typically a thread. These threads are then scheduled by the operating system within the process. This scheduling is typically pre-emptive. Alternatively, an ad hoc scheduler within the process may schedule the software modules, which are then referred to as tasks executed in parallel within the process. Scheduling thereof may then be pre-emptive or not. The ad hoc scheduler may be merged with the management module of the bus 2.4 or an independent module, not shown, depending on the embodiment.

In the process 2.3, a thread 2.5 is found, intended for managing the bus for the process. The thread 2.9 is a client process of the bus. On the other hand, the thread 2.10 is not a direct client of the bus. It hosts a bus management module 2.11 internal to the thread and one or more tasks 2.12, 2.13 and 2.14. It is then these tasks that are the clients of the bus. These tasks are scheduled within the thread 2.10 by an ad hoc scheduler, which may be merged with the bus management module 2.11 or not.

The software is then divided into processes 2.2, 2.3. Each process contains a management module of the bus 2.4, 2.5. It also hosts one or more client software modules of the bus 2.6, 2.7, 2.8 and 2.9. These clients of the bus may be threads or tasks executed directly within the process. These clients may also comprise tasks 2.12, 2.13 and 2.14 executed within a thread. The thread then also hosts a management module of the bus 2.11.

Figure 3:
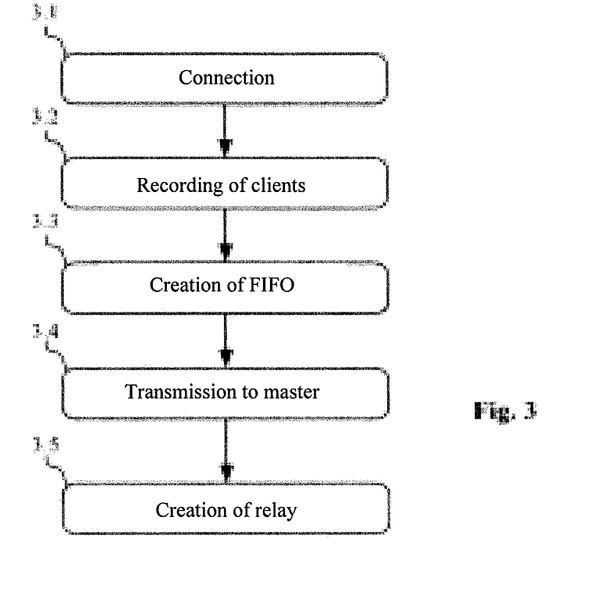
FIG. 3 illustrates the phase of initialisation of the bus in a machine.

The phase of initialisation of the bus in a machine takes place in the following manner illustrated by FIG. 3. The client software modules that are to communicate with the bus are distributed within one of more processes. One of these processes is elected master process. The other processes, if there are any, are therefore slave processes.

During a step 3.1, the management modules of the bus of the slave processes establish a connection link with the management module of the bus of the master process. Typically, this connection link is a UNIX socket.

During a step 3.2, each client software module of the bus is registered with the latter. This registration takes place with the management module of the bus of the process, or of the thread, on which the client software module depends. Advantageously this registration comprises the name of the software module, reference to the management module of the bus on which said client software module depends, as well as a visibility mode. The visibility mode comprises a private mode in which the client software module of the bus can send a message to other public clients and receive a response relating thereto on the bus, but not receive direct messages from the other public clients. It also comprises a public mode in which the client software module of the bus makes public its name and its location and can therefore receive messages in addition to sending them.

During step 3.3, for each client software module of the bus that is registered, the management module of the bus creates an FIFO (First In First Out) used in the case of an exchange on the same management module of the bus. These FIFOs may be simple FIFOs, that is to say not protected by a mutual exclusion, if the sequencing of the management module of the bus and of the clients of the bus under its responsibility is cooperative. In the contrary case, FIFOs protected by a mutual exclusion mechanism are used. Each management module of the bus has an FIFO used in the case of exchanges with a different management module of the bus for managing the receptions of messages relating to this client module.

During a step 3.4, the management module of the bus of a slave process that receives registrations of client software modules of the bus exports these registrations to the management module of the bus of the master process. This management module of the bus maintains a table, referred to as a user routing table, of the client software modules of the bus present on the machine. The users here being the client modules of the bus. Advantageously, only the modules that are declared public are present in this table.

During a step 3.5, the management module of the bus of the master process initiates, in the master process, as many software modules as there are client software modules of the bus in the slave process in the device. These software modules are managed by the management module of the bus of the master process and are called relay (proxy) software modules. This step is optional. The relay processes may alternatively be created as required during message exchanges, as will be described below.

This phase of initiation of the bus in the device therefore constitutes an internal discovery phase where the various processes in the device establish a communication with the process elected as master and where each client software module of the bus in the device is discovered by the management module of the bus of the master process that maintains a table of all the clients of the bus in the device.

The initialisation of the bus advantageously also comprises a step of discovery between machines participating in the bus. This step is illustrated by the flow diagram in FIG. 4. It is implemented for each device by the management modules of the bus of the master processes.

Figure 4:
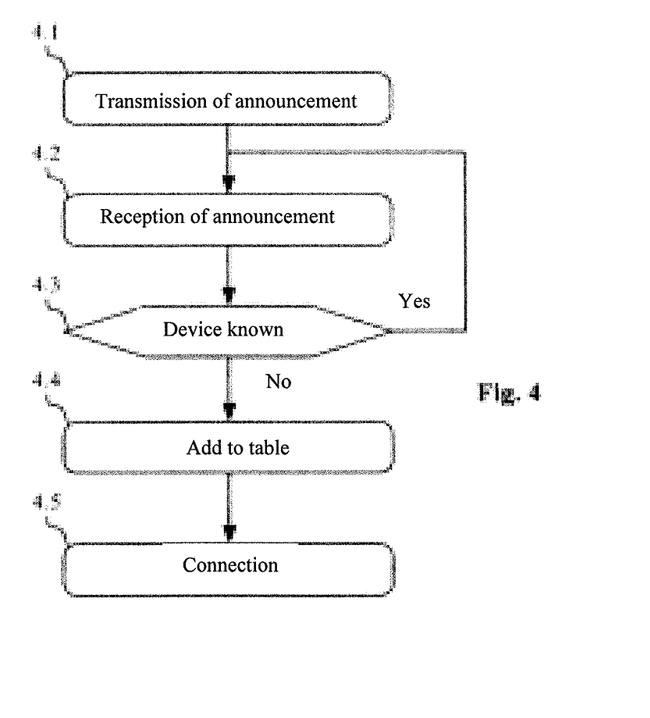
FIG. 4 illustrates the phase of discovery between machines participating in the bus.

During an announcement step 4.1, each device sends an announcement over the communication network connecting the devices. Advantageously this sending is made over the LAN links in broadcast mode on the sub-network thereof and on the WAN links in multicast mode on a particular group. Advantageously, this sending is repeated over time to enable new machines connecting to the bus to discover the existing machines. The announcement message advantageously contains the name of the machine as well as its IP address and a port for enabling an IP connection.

During a step 4.2, the device receives an announcement message coming from a distant device.

During a step 4.3, the device then checks whether the distant device from which it has received the announcement is known. Advantageously, it maintains a table of known machines and it then suffices for it to check in this table whether an entry exists for this distant device.

If the device is already known, there is nothing to do and looping is effected while awaiting the reception of another announcement message.

If the device is not known, it is added to the table during a step 4.4. An entry is created in the table of known machines, which is shown with the name of the distant device, its IP address and the port on which it can be joined.

During a step 4.5, a connection is established with this distant device. This connection may take the form of an INET socket dedicated to communication between machines. Advantageously, two INET sockets are created, one using the TCP (Transmission Control Protocol) dedicated to the exchanges of messages and another using the UDP (User Datagram Protocol) dedicated to signalling messages such as the announcement message.

At the end of this inter-machine discovery phase, the management modules of the bus of each master processor of each machine connected to the bus are all interconnected. At each machine, all the distant machines are known and referenced. A communication link is established to each of these distant machines.

The exchange of messages between two client software modules of the bus uses the same programming interface, API (Application Programming Interface), for access to the bus, whatever the type of software module.

Figure 5:
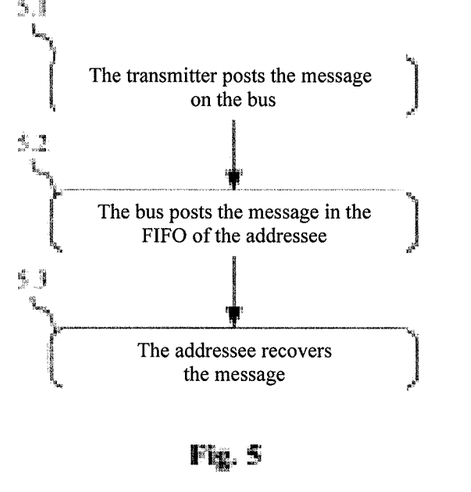
FIG. 5 illustrates the exchange of messages between two client software modules of the bus that depend on the same bus management module.

The exchange of messages between two client software modules of the bus that depend on the same management of the bus is illustrated by FIG. 5. In this case, the two clients are typically tasks within the same thread.

During a step 5.1, the sender posts its message via the API of the bus, specifying the name of the addressee.

During step 5.2, the management module of the bus perceives that the addressee forms part of its sphere, for example by comparing the reference of the management module of the bus of the addressee with its own, and posts the message in the simple FIFO thereof.

During step 5.3, the addressee recovers the message or messages that are intended for it by an operation of extracting the simple FIFO.

Figure 6:
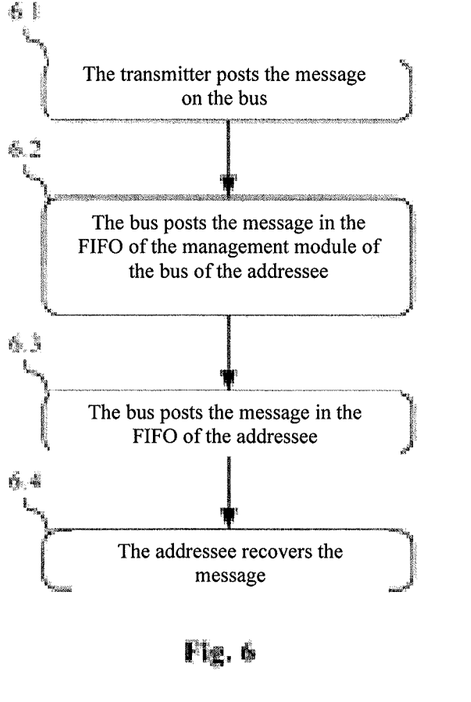
FIG. 6 illustrates the exchange of messages between two client software modules of the bus that do not depend on the same bus management module, but are hosted in the same process.

The exchange of messages between two client software modules of the bus that do not depend on the same management module of the bus, but are stored within the same process, is illustrated by FIG. 6.

During a step 6.1, the sender posts its message via the API of the bus, specifying the name of the addressee.

During step 6.2, the management module of the bus perceives that the addressee does not form part of its sphere, for example by comparing the reference of the management module of the bus of the addressee and its own, and posts the message in the FIFO of the management module of the bus of the addressee.

During a step 6.3, the management module of the bus of the addressee extracts the message or messages present in its FIFO, posting them in the FIFO of the addressee of said messages.

During a step 6.4, the addressee recovers the message or messages that are intended for it by means of an operation of extracting the FIFO.

Concerning the transmission of a message between a sender and a receiver formed by client software modules of the bus that are situated on different processes, the transmission uses relay software modules. The bus then has means for initialising, within each process, a client software module of the bus managed by the bus and which serves as a relay of the distant software module. Thus a relay software module of the addressee is created within the process of the sender, while a relay software module of the sender is created within the process of the addressee. These relay software modules are managed by the bus. Thus, seen from the sender or the addressee, the communication appears to be always internal to the process. The same primitives may be used by the client software modules of the bus. It is the bus that manages the interprocess communication via these relay software modules. These relay software modules also enable asynchronous functioning of the communications. This is because the sender posts its message with the relay software module of the addressee and can continue its processing. During this time, the bus routes the message to the real addressee by means of an interprocess connection, typically a UNIX socket.

Concerning this communication between processes, it has been seen that, on initialisation of the bus, a communication link is established between the slave processes and the master process. On the other hand no link is created between the slave processes with each other. Consequently, as required, that is to say when the sender and the addressee are hosted by two slave processes, a link is created, typically a UNIX socket, between the two slave processes.

The transmission process between a sender and an addressee hosted on different machines takes place exactly on the same scheme. It also involves a relay module of the sender within the process of the addressee and a relay module of the addressee within the process of the sender. A routing phase managed by the management modules of the bus of the master processes of the two machines enables a direct connection to be created between the two processes. The connection is here typically an INET socket.

Figure 7:
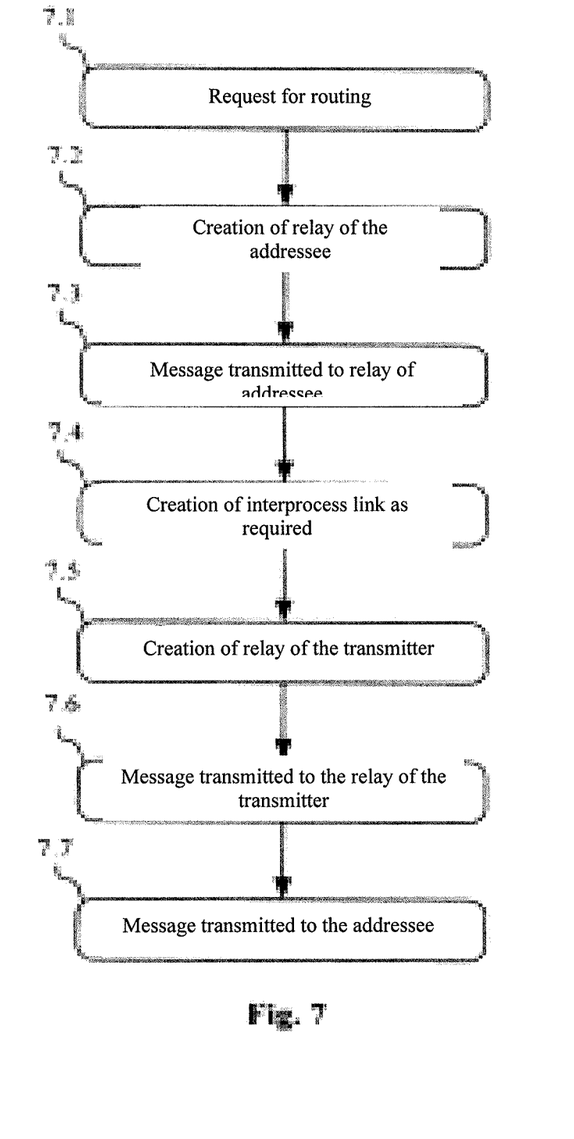
FIG. 7 illustrates the exchange of messages between two client software modules of the bus hosted on different processes, or even different machines.

The communication is then effected as illustrated by FIG. 7.

During a first step 7.1, the client software module of the bus that wishes to send a message that is called the sender performs a routing step with the name of the addressee with the bus, that is to say with the management module of the bus on which it depends.

During a step 7.2, when the bus perceives that the addressee is not hosted by the same process, it creates the relay software module of this addressee within the process of the sender. In some embodiments, this relay module may be pre-existing, for example within the master process if the relays were created during the initialisation phase, see the optional step 3.5.

During step 7.3, the message is then transmitted to this relay software module in accordance with the mechanism described for a transmission of messages within the process. If the communication is asynchronous, the sender can then resume its processing.

During step 7.4, the bus will create, as required, the direct connection link with the process hosting the addressee. Several cases present themselves here. If the communication takes place within the same machine, between a slave process and the master process, the communication link already exists. A creation is unnecessary. If the communication takes place within the same machine, between two slave processes, the communication link must be created between the two slave processes, typically in the form of a UNIX socket. If the communication takes place between two different machines, the direct link must be created between the two processes, typically in the form of an INET socket. This creation is negotiated by the master processes of the two machines, which exchange the necessary addresses and ports.

During step 7.5, the bus creates a relay software module of the sender in the process hosting the addressee.

During step 7.6, the message is then transmitted between the two relays via the direct communication link established between the two processes.

A last step 7.7 then consists of transmitting the message via the interprocess mechanisms already described to the final addressee.

Advantageously, the naming of the client software modules of the bus occurs in accordance with a scheme derived from the scheme used for URLs (Uniform Resource Locators). According to the scheme, the name of a module is broken down as follows: "ism://name_machine/name_module_software" where ISM is the name given to the protocol of the bus according to the invention. Within the same machine, a relative naming reduced to "name_module_software" may be used.

Advantageously, the various copies of the messages in the FIFOs within the same process are avoided. The message being copied once in a common memory space, only one reference on this message is then exchanged. This limits actual copying.

Figure 8:
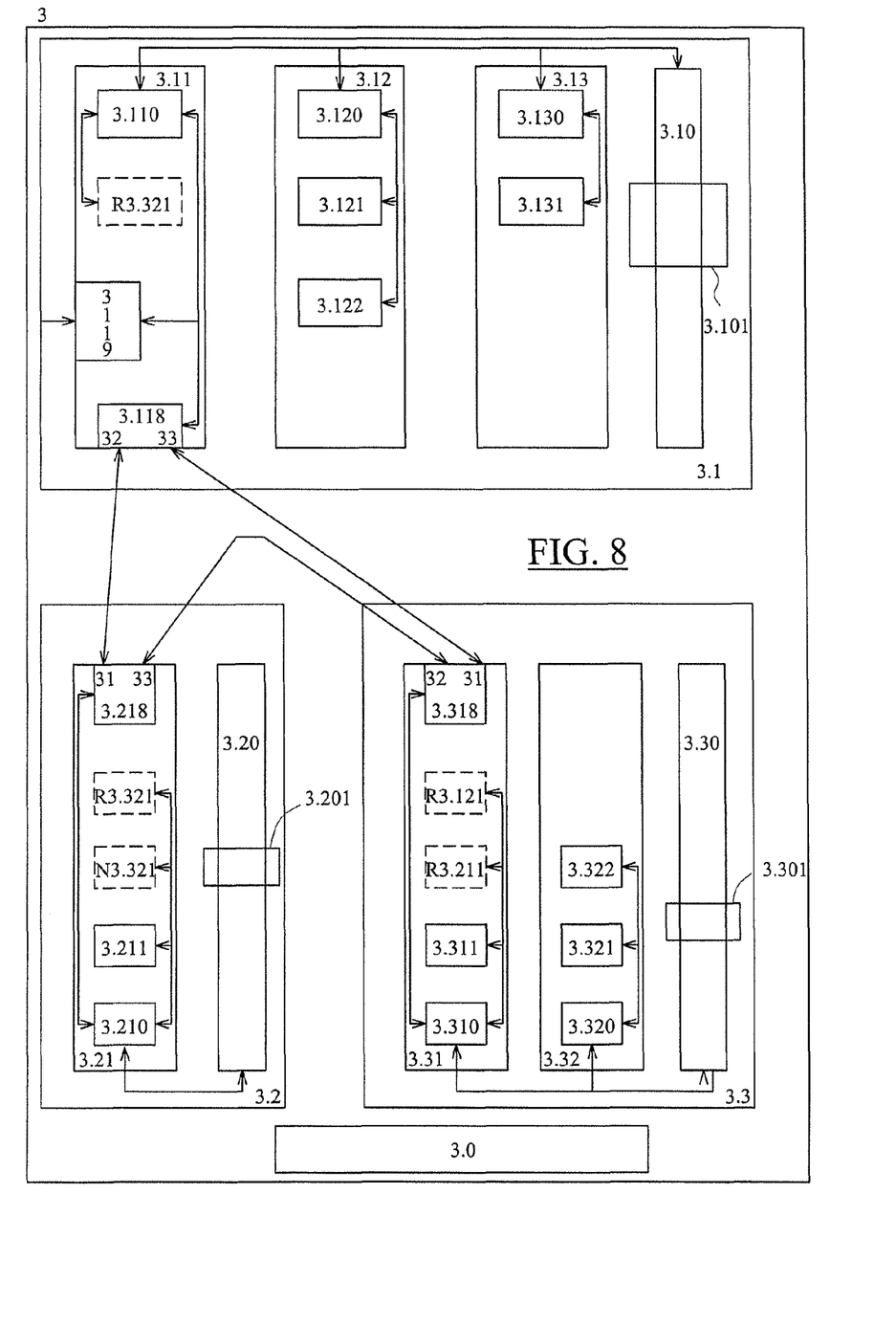
FIG. 8 illustrates the architecture of an information processing device according to a particular embodiment.

FIG. 8 shows an example of a configuration of an information processing device 3, at a given instant, having particularities compared with the information processing devices shown in FIGS. 1 and 2 of the present description, particularities that will emerge from a reading of the remainder of the present description.

As can be seen, at the time in question, this information processing device 3 enables three processes 3.1, 3.2 and 3.3 to be executed in parallel. These three processes are scheduled by an operating system 3.0 of the information processing device 3.

The process 3.1 itself contains several threads 3.11, 3.12 and 3.13, which are executed in parallel while being scheduled by the operating system 3.0. It also contains a management module of the bus of the same type as the process 3.10.

The thread 3.11 contains system tasks, namely a communication module of the interprocess type 3.118 enabling messages to be exchanged between processes (as will be explained below) as well as a communication module of the inter-device type 3.119 for enabling messages to be exchanged between various information processing devices. The thread 3.12 contains two user tasks 3.121 and 3.122 as well as a bus management module of the thread 3.120 type including the proprietary scheduler (not shown) of all the tasks of the single thread 3.12, in this case the two tasks 3.121 and 3.122. The thread 3.13 contains a user task 3.131 as well as a bus management module 3.130 of the thread type including the proprietary scheduler of the user task 3.131.

The process 3.2 contains a thread 3.21 and a bus management module of the process 3.20 type. The thread 3.21 contains a user task 3.211 and a system task, namely a communication module of the interprocess type 3.218 as well as a management module of the bus of the thread 3.210 type including the proprietary scheduler of all the tasks of the single thread 3.21, in this case the user task 3.211 and the communication module 3.218.

The process 3.3 contains two threads 3.31 and 3.32 and a bus management module 3.30 of the process type. The thread 3.31 contains a user task 3.311 and a system task, namely the communication module 3.318 of the interprocess type, as well as a bus management module 3.310 of the thread type including the proprietary scheduler of all the tasks of the thread 3.31, namely the task 3.311 and the communication module 3.318. As for the process 3.32, it comprises two user tasks 3.321 and 3.322 as well as a bus management module 3.320 of the thread type including the proprietary scheduler of all the tasks of the thread, namely the tasks 3.321 and 3.322.

It is noted that the scheduling architecture is hierarchical and thus comprises, within the same process, one or more threads itself including one or more tasks. Moreover, the scheduling of the processes and threads will be considered to be pre-emptive and performed by the operating system 3.0 of the information processing device. As for the scheduling of the tasks within a thread, it will be considered to be pre-emptive or not and performed by a proprietary scheduler, that is to say dependent on said thread.

It will be noted that, at another time, this configuration may have changed because, for example, a task, a thread or even a process has ended its execution, or because a task has moved, in a so-called mobile mode, from a thread to another thread, of the same process or a different process.

Each management module of the bus of the thread type comprises a protected FIFO as well as FIFOs that are respectively dedicated to the user tasks of the corresponding thread. The function of these FIFOs is explained below. The FIFOs are not shown in FIG. 8 in order not to burden this figure.

Each management module of the bus of the process type 3.10, 3.20 and 3.30 further contains a routing table 3.101, 3.201, 3.301 in which there are stored, for each task, its name and its reference to the FIFO in the management module of the bus of the corresponding thread type.

Each task has the possibility of sending and receiving command messages, sending and receiving responses to command messages and sending and receiving notifications and sending and receiving responses on notification.

To send a command message, a task calls a unique typical method for this type of message accepting as parameters the reference of the relevant task supplied during its registration within said relevant bus, the names of the relevant bus and task (<name_distant_bus>/<name_distant_task>), optionally, if the task requires a response, a reference and a callback function prototyped by the bus for this type of response, as well as the parameters necessary for executing the demand.

To receive a command message, a task positions by means of a method disclosed by said bus for this type of command reception, an event-triggered function (referred to as callback) prototyped by said bus and a reference used for triggering this function.

To send a notification, a task calls a unique typical method for the type of notification accepting as parameters the reference of the task concerned, which is provided at the time of its registration in said bus, optionally if the task requires a response, a reference and callback function prototyped by the bus for this type of response, as well as the parameters necessary for the notification.

Finally, to receive a notification, a task positions the name of the bus concerned and the name of the task concerned <name_distant_bus>/<name_distant_task>, an event-triggered function (callback) prototyped by said bus and a reference for triggering said function.

To send a message of response to a command message or to a notification, a bus management module calls a unique typical method for this type of response accepting as parameters the reference of the message supplied by the call to the callback function pre-assigned to the reception of said message and the parameters necessary for said function.

The various tasks, the various threads and processes shown in FIG. 1 belong to the same logic entity, referred to as a software bus, which is named, by way of example, "bus__1".

The invention uses a master/slave hierarchical architecture only for the routing function. Thus, within an information processing device, a process is initialised in master mode and the other processes of the same device are initialised in slave mode. In the example of a configuration shown, within the information processing device 1, the process 3.1 is thus initialised in master mode and the processes 3.2 and 3.3 are initialised in slave mode.

It will be noted that several buses with different names including a master process and slave processes may coexist on the same information processing device.

The master process 3.1 has a communication module 3.118 of the interprocess type 3.118 of the master process 3.1 which is in a listening mode on a Unix socket called "/var/run/bus__1/Master" and the communication modules 3.218 and 3.318 of the interprocess type are in a connection mode to the Unix socket of the master process 3.1.

It will be noted that, in general, the names of the buses of the master and slave processes are identical on the same information processing device but nothing prevents the contrary.

After connection between slave processes and master process and identification and authentication with access list, the slave processes 3.2 and 3.3 have connections to the master process respectively on the ports 3.118_12 and 3.118_13. Each connection of the processes is recognised as a connection to the bus name in question, in this case the bus "bus__1".

For the process of routing the messages between tasks, the invention uses a centralised hierarchical architecture whereas for exchanging messages between tasks it uses a distributed architecture. To illustrate these two features, examples of implementation of message exchanges ²transmitted between tasks are given below.

It will thus be considered that, within the information processing device 1 and the same process, whether it be master or slave, a task wishes to send a message to another task forming part of the same thread. For example, the task named 3.321 wishes to send a given message to the task named 3.322 forming part of the same thread 3.32. The management module of the thread bus 3.321 takes charge of the message in question and asks the bus management module of the process type 3.30 for the route that the message should follow. Provided with its routing table 3.301, the bus management module of the process type 3.30 replies to it with the reference of the non-protected FIFO dedicated to the task 3.322 hosted by the same management module of the thread bus 3.320. Said management module of the thread bus 3.320 then posts said message in said FIFO and triggers a request for scheduling of this destination task 3.322. Once this task has been scheduled, the message is extracted from the FIFO and is taken into account by the task 3.322 by calling its event-triggered function (callback) with the parameters contained in the message.

Let now consider a task which, within the information processing device 1, wishes to send a message to a task forming part of another thread but still of the same process. For example, the task named 3.321 wishes to send a given message to the task named 3.311 forming part of another thread 3.31 but of the same process 3.3. The management module of the thread bus 3.321 takes charge of the message in question and asks the bus management module of the process type 3.30 for the route to follow. The latter responds to it with the reference of the protected FIFO of the bus management module 3.310 of the thread type. Said bus management module 3.320 of the thread type then posts the message in said protection FIFO of the bus management module of the thread 3.310 and, by a means made available by the operating system 3.0, makes a request for scheduling of the management module containing said FIFO, namely the bus management module 3.310. Once the bus management module 3.310 is scheduled, the bus management module of the thread 3.310 extracts the message from the protected FIFO and then, like the previous case, makes a routing request to the bus management module 3.30 of the process and obtains from the latter a reference of a non-protected FIFO for reception of the message by the destination task 3.311. The bus management module 3.310 of the thread then posts the message in this FIFO and makes a request for scheduling of the destination task 3.311. Once the task 3.311 is scheduled, the message is extracted from the FIFO and is taken into account by the task 3.311 by calling its event-triggered function (callback) with the parameters contained in the message.

It will be noted that, if an FIFO is not empty at the time that a message is posted therein, it is that the message or messages that it contains are not yet extracted. However, this also means that the awakening of the corresponding thread has already been triggered. It will therefore be possible to awaken the thread in question only where the FIFO is empty.

It will also be noted that the routing process is routinely implemented in order to satisfy the mobile side of the user tasks. This is because, even if the destination task has migrated before the extraction of the message from the protected FIFO, the routing process enables the necessary rerouting.

Let now be consider that, within the information processing device 1, a task on a thread of a slave process wishes to send a message to another task hosted on a thread of the master process. For example, the task 3.321 wishes to send a given message to the named task 3.121 hosted on the thread 3.12 of the process 3.1. The bus management module of the thread type 3.320 takes charge of the message and asks the bus management module 3.30 of the process type for the route to follow for this message. The bus management module 3.30 now replies that the destination task 3.121 is unknown to it. It stores the message to be transmitted and sends a message of the "distant-task search" message type (as emanating from the local task 3.321) using the signalling connection 3.318_13. The communication module 3.118 of the process 3.1 of the thread 3.11 receives, on its connection 3.118_33, the message of the "distant-task search" type and informs the bus management module 3.10 of the process type, which then looks in its routing table 3.101.

In the routing table 3.101 of the bus management module 3.10, the destination task 3.121 is known to be resident on the thread 3.12. According to the invention, the bus management module of the process type 3.10 creates a distant relay task R3.321 with the characteristics extracted from the search message on the same thread as the communication module that received this search message (namely, the thread 3.11) and sends, to the management module 3.30 via the connection receiving the search message, namely the connection 3.118_33, in response to said search message, a message of the "add relay task" type (as emanating from the task 3.121) with the characteristics needed for creating a relay task. The communication module 3.318 of the process 3.3 of the thread 3.31 receives, on its connection 3.318_31, the message of the "addition of remote task" type and informs the bus management module of the process type 3.30. The latter creates the relay task R3.121 with the characteristics extracted from the message on the same thread as the communication module that received the message of the addition type (in this case the thread 3.31) and enhances its routing table with this new task. There follows a search for the messages awaiting routing corresponding to this name. The corresponding messages are stored in the non-protected FIFO dedicated to the destination task R3.121.

The management module of the bus of the thread type 3.310 makes a demand for scheduling of this relay task R3.121. Once this task has been scheduled, the bus management module 3.310 of the thread type serialises the message in the connection 3.318_31 of the communication device 3.318. The connection 3.118_33 managed by the bus management module 3.110 of the thread type receives and deserialises the message. The management module 3.110 then performs all the operations already described for posting the message in the FIFO dedicated to the task 3.121 and, if this FIFO is empty, for making a scheduling demand. Once the task 3.121 has been scheduled, the message is extracted from the FIFO and is taken into account by the task 3.121 by calling its event-triggered function (callback) with the parameters contained in the message.

As will be understood, the task 3.321 can communicate with the task 3.121 by means of the relay tasks R3.121 of the thread 3.31 and R3.321 of the thread 3.11.

Let us consider again that, in the information processing device 1, a task of a slave process wishes to send a given message to another task that is now hosted on a thread of another slave process. For example, the task 3.321 wishes to send a given message to the task named 3.211 hosted by the process 3.2 on the thread 3.21. The bus management module 3.320 of the thread type 3.320 takes over the message and requests the bus management module 3.30 of the process type for the route to follow for the message. It replies to it that the destination task is unknown to it. It stores the message and sends a message of the "remote task search" type (as emanating from the task 3.321), using the communication module of the interprocess type 3.318. The communication module 3.118 of the master process 3.1 and of the thread 3.11 receives the message of the "remote task search" type on its signalling-type connection 3.118_33 and informs the management module of the bus of the process type 3.10, which looks in its routing table 3.101.

In the latter, the destination task 3.211, since it is not hosted by the master process 3.1, is not known. The bus management module 3.10 of the process type broadcasts this search message in all the connections that are established bearing the name of the relevant bus, "bus_1", other than the one that saw said first search message passed, that is to say in the connections bearing the name "bus_1" of the communication module 3.119 and 3.118_32. Upon reception, on its connection, of this message of the "remote task search" type, each communication module informs the bus management module of the process type on which it depends, which looks in its routing table for the presence or not of the destination task sought.

Only the communication module 3.218 of the process 3.2 of the thread 3.21 has, in its routing table 3.201, the relevant task 3.211 resident on the same process and on the same thread as it and advises the management module of the bus of the thread type 3.20 of this, which creates, on the same thread 3.21 as the communication module 3.218 that received the search message, a relay task R3.321 with the characteristics extracted from the search message, enhances its routing table, effects a search for a message awaiting routing, as already explained above, and transmits a message of the "add remote relay task" type (as emanating from the task 3.211) with as its connection parameters the name of the Unix socket named "/var/run/bus_1/Slave_3.2". The communication module 3.118 of the process 3.1 of the thread 3.11 receives the message of the "add remote relay task" type on its connection 3.118_32 and propagates it to the connection 3.118_33 from where the first search request came. The communication module 3.318 of the process 3.3 of the thread 3.31 receives in its turn the message of the "add remote relay task" type on its connection 3.318_31 and informs the management module of the bus of the process type 3.30 of this.

The latter then creates, on the same thread 3.31 that hosts the communication module 3.318 that received the message of the "add remote relay task" type 3.318, the relay task R3.211 with the characteristics extracted from the search message, and then enhances its routing table 3.301 with said relay task R3.211. Moreover, it initialises a connection request with the information contained in said message of the "add remote relay task" type, and then upon acceptance of the connection an identification and authentication phase with access list. There follows a search for messages awaiting routing corresponding to this name. The corresponding messages are stored in the non-protected FIFO dedicated to the destination task R3.211.

The bus management module of the thread type 3.310 makes a request for scheduling this relay task R3.211. Once the relay task R3.211 is scheduled, the bus management module 3.310 of the thread type serialises the message in the connection 3.318_32 contained in the communication module 3.318. The connection 3.21_33 managed by the bus management module 3.210 receives and deserialises the message.

The management module 3.210 then performs all the operations already described for posting the message in the dedicated FIFO of the task 3.211 and, if this FIFO is empty, for making a scheduling request. Once the task 3.211 has been scheduled, the message is extracted from the FIFO and taken into account by the task 3.211 by calling its event-triggered function (callback) with the parameters contained in the message.

The latter operating mode can be extended to the exchange of messages between information processing devices, the message of the add remote task type will then arrive through the inter-device communication module 3.119 with the information of an INET socket of the ip:port address type. In this case, a serialisation/deserialisation phase is necessary.

In mobile mode, the functioning of a bus according to the invention is as follows.

Let us consider that, in the information processing device 1, the task named 3.321 deregisters from the bus. The corresponding bus management module 3.321 of the thread type will release the FIFO resource, the resource of the scheduler and the reference resource supplied at the time of registration. It also generates a remote task elimination message 3.321 to all the local tasks of all the threads of the process and to all the connections of the signalling type of the process by means of the communication module 3.318. The connection 3.118_33 of the communication device 3.118 receives this message and informs the bus management module 3.10 of the process type, which checks whether it has corresponding remote relay tasks. If such is the case, it will release them. If messages were awaiting acknowledgement, these are reinserted in the FIFO awaiting a remote task search process, a process that will therefore be initiated. The bus management module of the process type will also check whether connections of the data type are without a link to remote relay tasks. If such is the case, it will release this connection and propagate the message over all these signalling connections other than the one from which the message came, that is to say 3.118_32 and 3.119. The connection 3.128_31 of the communication device 3.218 receives this message and informs the management module of the bus of the process type, which checks whether it has corresponding remote relay tasks. If such is the case, it will release them. If messages were awaiting acknowledgement, these are reinserted in the FIFO awaiting a remote task search process, a process that will therefore be initiated. The management module of the bus of the process type will also check whether connections of the data type are without any link to remote relay tasks. If such the case, it will release this connection.

If, in addition, the task 3.321 is inserted in the thread 3.21 of the process 3.2, the routing table of the management module of the bus of the process type 3.20 is enhanced by this name. The result is a procedure for seeking waiting messages corresponding to this name. In addition, the search messages corresponding to this name will be honoured.

Figure 9:
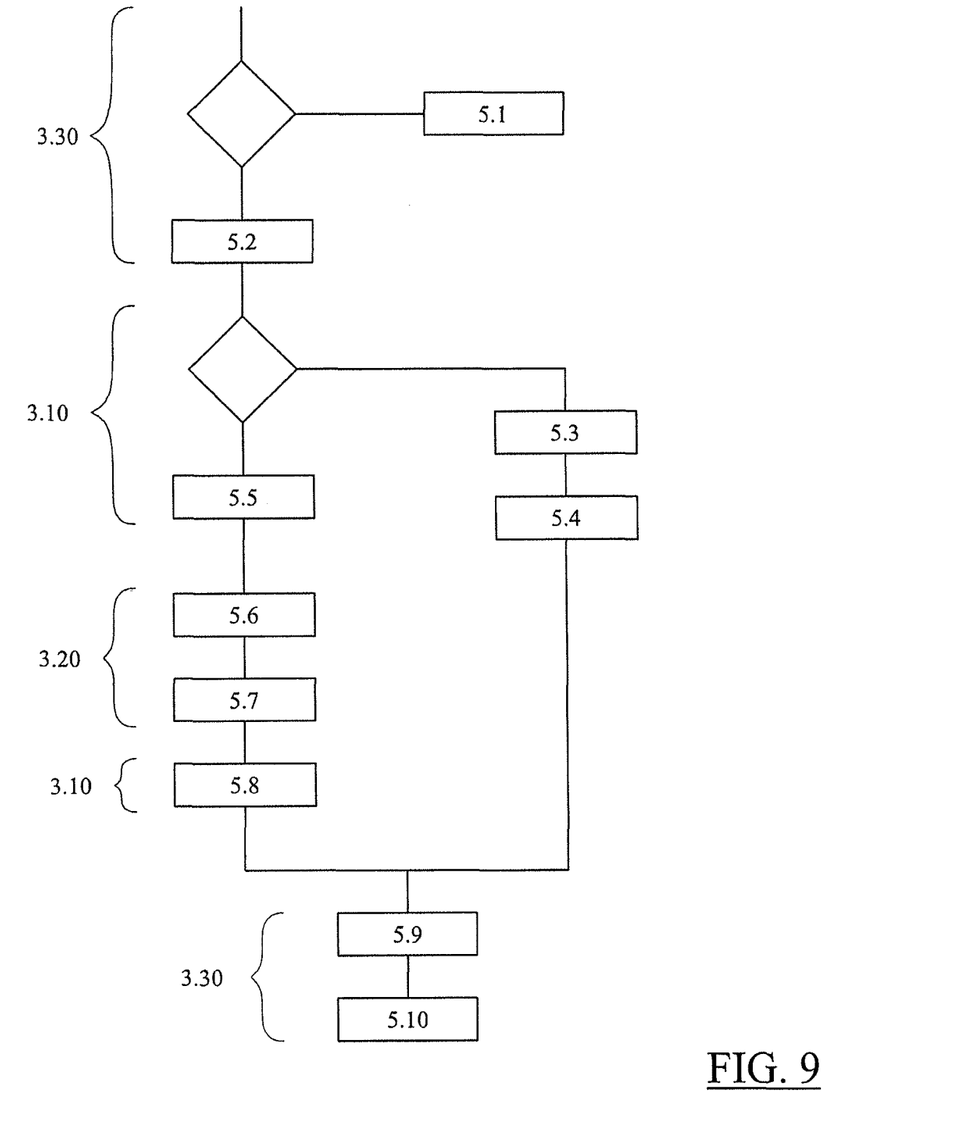
FIG. 9 is a diagram showing the various steps of a method according to the invention.

In summary, and in relation to FIG. 9, in order to transmit a message from a first task 3.321 to a second task, a message exchange method according to the invention comprises:

the following steps implemented by the bus management module 3.320 of the thread 3.32 hosting said first task 3.321:

when said second task 3.322 or 3.311 belongs to the same process 3.3. as said first task 3.321, a step 5.1 of posting said message in the FIFO dedicated to said second task 3.322 so that the latter can take it into account, otherwise a step 5.2 of transmission of a message seeking the second task to said bus management module 3.10 of the master process 3.1, the following steps implemented by the bus management module 3.10 of the master process 3.1:

when said second task 3.121 is hosted by a thread 3.12 of said master process 3.1, a step 5.3 of creating a remote relay task R3.321 within a thread 3.11 of said master process 3.1, a step 5.4 of transmitting a response to said bus management module 3.320 of the thread 3.32 hosting the first task 3.321, otherwise, a step 5.5 of broadcasting, to each of said bus management modules of the process type (in this case, just the module 3.20), a message seeking the second task, the following steps implemented by the bus management module 3.20 of a slave process 3.2 hosting the second task 3.211, on reception of a message seeking the second task, a step 5.6 of creating a remote relay task R3.321 within a thread 3.21 of said slave process 3.2, a step 5.7 of transmitting a response to said bus management module 3.10 of the master process 3.1, the step 5.8 also implemented by the bus management module 3.10 of the master process 3.1, following the reception of the response transmitted by the bus management module 3.20 of the slave process 3.2, of transmitting a response to said bus management module 3.30 of the thread 3.32 hosting the first task 3.321, and the following steps implemented by the bus management module 3.30 of the thread 3.32 hosting said first task 3.321, when it has received a response from said bus management module 3.10 of the master process 3.1:

a step 5.9 of creating a relay task R3.211 corresponding to said remote relay task R3.321 within a thread 3.31 of said process 3.3 hosting said first task 3.321, and a step 5.10 of posting said message in the FIFO dedicated to said relay task R3.211, which will transmit it to the remote relay task R3.321, and then to the second task 3.211.

Thus, as illustrated below, the invention proposes a system for communicating between different tasks belonging to various threads, themselves belonging to different processes, said tasks being grouped together in the same entity or software bus or on the other hand belonging to different software buses.

In general, this communication between tasks uses a client/server mode of the command/response type based on 1 to 1 or 1 to n messages and of the notification/response type based on 1 to n messages. It uses a system of naming client tasks in accordance with a <bus name>/<task name> format. This communication can be done directly task to task or indirectly by interposed service such as a system of tasks producing command to service and then service to notification reader tasks. This communication takes place within the same processing device but may also occur between two information processing devices. In addition, for this communication, the task can be hosted and/or move on a certain information processing device or a certain process or a certain thread.

The communication is based on the name of the bus and the name of the task, on a hierarchical scheduling architecture, on a centralised architecture for the routing function, on a distributed architecture for the exchange of messages, and on phases of discovery and registration/deregistration of the various tasks on one or more bus names.

The invention claimed is:

1. Information processing device, comprising:
an operating system;
at least one process scheduled by said operating system, and
threads that can be scheduled in said processes by said operating system, wherein;

in each thread, at least one user task or a system task, each thread itself containing a first in first out ("FIFO") data structure for each task that said thread contains as well as a bus management module of the thread type itself integrating a so-called proprietary scheduler for scheduling the task or tasks of said thread, and a first task of a process that transmits a message to a second task, the first task comprises means for seeking the process on which said second task relies, and means, in response to said second task belongs to the same process as said first task, for posting said message in the FIFO data structure dedicated to said second task so that the second task can take the message into account, and means, in response to the second task belongs to a process other than the process on which said first task relies, for creating a so-called distant relay task in a thread or of said process on which the second task relies, for creating a so-called relay task in a thread of said process on which the first task relies, for posting said message in the FIFO data structure dedicated to said relay task, for transmitting said message to the distant relay task, for posting said message in the FIFO data structure of the second task so that the second task can take said message into account.

2. The information processing device according to claim 1, wherein the means for seeking the process comprises, for said or each process scheduled by said operating system, of bus management modules associated with each process, each of said bus management modules comprising a routing table listing the tasks and the threads of said process on which they depend.

3. The information processing device according to claim 1, wherein the means for transmitting a message between said relay task and said distant relay task comprises, for each process concerned, of an inter-process communication module hosted by a said thread or one of said threads of said process.

4. The information processing device according to claim 1, further comprising means for, when several processes are scheduled by said operating system, initializing one of said processes as a master process and the other processes as slave processes, said master process comprising an inter-device communication module hosted by a thread of said master process so as to be able to transmit a message between a relay task of said device and a remote relay task hosted on another information processing device.

5. Method for exchanging messages between tasks running on one or two information processing devices, said or each information processing device comprising:
an operating system;
at least one process sequenced by said operating system;
threads being able to be scheduled in said processes by said operating system; and
within each thread, at least one user task and/or one system task,
each thread itself containing a first in first out ("FIFO") data structure for each task that said thread contains, as well as a bus management module of a thread type itself integrating a proprietary scheduler for scheduling said thread,
wherein, in order to transmit a message from a first task to a second task, the method comprises the following steps implemented by the bus management module of the thread hosting said first task:

when said second task belongs to the same process as said first task, a step of posting said message in the FIFO data structure dedicated to said second task so that the second task can take the message into account, otherwise a step of transmission, to said bus management module of the process of said first task, of a message seeking the second task, the following steps implemented by the bus management module of the process of said first task:

when said second task is hosted by a thread of the process of said first task, performing:

a step of creating a distant relay task in a thread of said process of said first task, and a step of transmitting a response to said bus management module of the thread hosting the first task, otherwise:

a step of broadcasting, to each of said bus management modules of the processes, scheduled by said operating system, the message seeking the second task, the following steps implemented by the bus management module of a process hosting the second task, on reception of the message seeking the second task, a step of creating a distant relay task in a thread of said process of said second task, a step of transmitting a response to said bus management module of the process of said first task, the step, also implemented by the bus management module of the process of said first task, following the reception of the response transmitted by the bus management module of the process of said second task, of transmitting a response to said bus management module of the thread hosting the first task, and the following steps implemented by the bus management module of the thread hosting said first task, when a response is received from said bus management module of the process of said first task:

a step of creating a relay task corresponding to said distant relay task in a thread of said process hosting said first task, and a step of posting said message in the FIFO data structure dedicated to said relay task, which will transmit said message to the distant relay task, and then to the second task.

6. The method for exchanging messages between tasks running on one or two information processing devices according to claim 5, further comprising the following steps of initializing said bus, when several processes are scheduled by said operating system:

a step of initializing one of said processes as a master process and the other processes as slave processes, a step where the modules managing the bus of the slave processes establish a connection link with the management module of the bus of the master process;

a step where each client task of the bus is recorded with the management module of the process bus on which each client task relies;

a step of creating a first in first out ("FIFO") data structure associated with each client task of the bus and with each management module of the process bus;

a step where the management module of the bus of a slave process that receives a record of a client task of the bus exports this record to the management module of the bus of the master process.

7. The method according to claim 5, wherein the client tasks of the bus being recorded with a public or private mode, only public tasks are exported to the master process.

8. The method according to claim 5, further comprising a step of discovery between machines participating in the bus, said step of discovery between machines participating in the bus comprising:

an announcement step where each machine participating in the bus sends an announcement over a communication network connecting said machines;

a step of receiving an announcement message coming from a distant machine;

a step of adding the machine originating the announcement message received in a table in response the machine not already being known;

a step of establishing a connection with this distant machine.

* * * * *